United States Patent [19]
Dreyer, Jr.

[11] Patent Number: 5,497,294
[45] Date of Patent: Mar. 5, 1996

[54] CONSPICUITY ENHANCER

[75] Inventor: John F. Dreyer, Jr., North Oaks, Minn.

[73] Assignee: Minnesota Mining and Manufacturing Company, Saint Paul, Minn.

[21] Appl. No.: 275,938

[22] Filed: Jul. 15, 1994

Related U.S. Application Data

[63] Continuation of Ser. No. 926,818, Aug. 7, 1992, abandoned.

[51] Int. Cl.$^6$ ..................................................... F21V 8/00
[52] U.S. Cl. ........................... 362/32; 362/145; 362/225; 362/234; 362/252; 340/908; 340/815.4; 116/63 R; 116/63 P
[58] Field of Search ................................ 40/546, 547, 558, 40/564, 565; 362/31, 32, 234, 252, 225, 146, 145, 147; 340/815.31, 908; 116/63 R, 63 P

[56] References Cited

U.S. PATENT DOCUMENTS

| | | | |
|---|---|---|---|
| Re. 29,544 | 2/1978 | Fitch | 256/13.1 |
| 1,065,231 | 6/1913 | Finger | 40/565 X |
| 1,635,611 | 7/1927 | de la Lama | 40/565 X |
| 2,071,777 | 2/1937 | Van Bloem | 362/31 |
| 3,771,516 | 11/1973 | Corriero | 362/32 X |
| 4,260,220 | 4/1981 | Whitehead | 350/96.28 |
| 4,615,579 | 10/1986 | Whitehead | 350/96.1 |
| 4,642,736 | 2/1987 | Masuzawa et al. | 362/31 |
| 4,674,911 | 6/1987 | Gertz | 404/6 |
| 4,750,798 | 6/1988 | Whitehead | 350/96.10 |
| 4,805,984 | 2/1989 | Cobb, Jr. | 350/96.28 |
| 4,885,663 | 12/1989 | Parker | 362/32 |
| 4,906,070 | 3/1990 | Cobb, Jr. | 350/286 |
| 4,952,023 | 8/1990 | Bradshaw et al. | 350/102 |
| 4,977,487 | 12/1990 | Okano | 362/32 |
| 5,009,020 | 4/1991 | Watanabe | 362/32 X |
| 5,043,850 | 8/1991 | Dreyer, Jr. | 362/26 |
| 5,046,826 | 9/1991 | Iwamoto et al. | 362/31 X |
| 5,056,892 | 10/1991 | Cobb, Jr. | 359/831 |
| 5,112,028 | 5/1992 | Laturner | 256/13.1 |
| 5,193,893 | 3/1993 | Mitko | 362/32 |

FOREIGN PATENT DOCUMENTS

| | | | |
|---|---|---|---|
| 547863 | 6/1956 | Belgium | 116/63 R |
| 30160 | 7/1959 | Finland | 40/546 |
| 652165 | 10/1937 | Germany | 40/546 |
| 455864 | 7/1968 | Switzerland | 362/31 |
| 656425 | 8/1951 | United Kingdom | 362/31 |

Primary Examiner—Carl D. Price
Attorney, Agent, or Firm—Gary L. Griswold; Walter N. Kirn; Stephen W. Buckingham

[57] ABSTRACT

A conspicuity enhancer includes a case defining an optical cavity having an output optical window. The conspicuity enhancer also includes first and second linear light sources forming a V. Each linear light source has a light emitting device that inserts light into one end of the light source. The other end of each light source is attached to the case such that each linear light source is in optical communication with the optical cavity.

9 Claims, 2 Drawing Sheets

CONSPICUITY ENHANCER

This is a continuation of application Ser. No. 07/926,818, filed Aug. 7, 1992, abandoned.

Permanent rigid obstacles in or along roadways can create significant hazards for motorists. Examples of such obstacles are bridge supports and barriers separating exit ramps from freeways. Such obstacles become more hazardous at night or under conditions of fog or other weather conditions that obscure their visibility. Various techniques have been used to increase the visibility of such obstacles. One such technique is to provide a high visibility sign. Such a sign is preferably retroreflective and typically has a chevron pattern indicative of a barrier. An alternative that may be used alone or along with such a sign is a flashing light. Both of these techniques help to improve the visibility of the obstacles, thus reducing the number of accidents and injuries.

Another technique, used either alone or in conjunction with such visibility enhancers, is the positioning of energy absorbing crash attenuators in front of the obstacle. Such attenuators are generally manufactured of collapsible materials such that when a vehicle strikes them, they will collapse decelerating the vehicle at a lower rate than would result from striking a rigid object. Examples of such crash attenuators are described in U.S. Pat. Nos. 4,674,911 (Gertz) and 5,112,028 (Laturner) and Reissue U.S. Pat. No. RE 29,544 (Fitch). While such crash attenuators do not reduce the number of accidents occurring, they significantly help reduce the severity of injuries resulting from such accidents.

Even with such visibility enhancers and crash attenuators, there are a significant number of accidents resulting in serious injuries. Although the crash attenuators can help reduce injuries, they will not eliminate them. Clearly, therefor, what is required to significantly enhance roadway safety around such obstacles is to increase their conspicuity.

SUMMARY OF THE INVENTION

According to the present invention, a conspicuity enhancer includes a case defining an optical cavity having an output optical window. The conspicuity enhancer also includes first and second linear light sources forming a V. Each linear light source has a light emitting device that inserts light into one end of the light source. The other end of each light source is attached to the case such that each linear light source is in optical communication with the optical cavity.

DETAILED DESCRIPTION OF A PREFERRED EMBODIMENT

Figure 1:
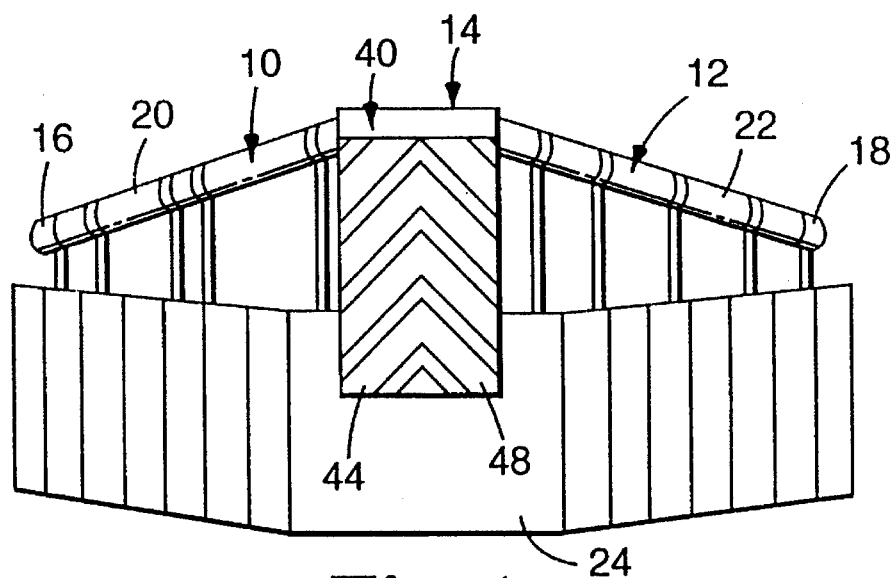
FIG. 1 shows a first embodiment of the invention.

The present invention provides increased visibility to such rigid obstacles by utilizing an internally illuminated warning sign along with a pair of line light sources that form a V around the barrier. FIG. 1 illustrates a first embodiment of the invention. As shown in FIG. 1, the conspicuity enhancer of the invention includes first and second linear light sources 10 and 12 and sign 14. Linear light sources 10 and 12 include light emitting elements 16 and 18 and light conduits 20 and 22, respectively. It will be understood that the term "linear" as used herein refers to the fact that the lengths of light sources 10 and 12 are much greater than their diameters. Although they are preferably straight, they could be curved without deviating from the invention. Light emitting elements 16 and 18 inject light into light conduits 20 and 22.

Light emitting elements 16 and 18 are preferably sources of at least partially collimated light. If a particular color of light is desired, a colored filter may be placed between light emitting elements 16 and 18 and tubes 20 and 22.

At the end of light conduits 20 and 22, and in optical communication therewith, is sign 14. The light that has not escaped from light conduits 20 and 22 will enter sign 14 providing its internal illumination. The size of light conduits 20 and 22 should be chosen to provide sufficient light transport to illuminate internally illuminated sign 14 as well as forming a clearly visible V to indicate the edges of the obstacle. Light conduits having diameters of approximately 10 cm. and lengths of approximately 6 m. have been shown to fulfill these dual requirements.

In a preferred embodiment, a crash attenuator 24 may be placed inside the V formed by linear light sources 10 and 12. Attenuator 24 may be any commercially available attenuator and may even be one that was in place prior to a conspicuity enhancer according to the present invention being installed.

As may be seen from FIG. 1, linear light sources 10 and 12 slope downward slightly. In this context it will be understood that sloping downward means that the ends of conduits distant from sign 14 are lower than the ends adjacent sign 14. Although they could be horizontal, it has been found that a slight deviation from the horizontal is preferable. This is because placing them at an angle gives a greater visual impression of depth than do horizontal tubes. In addition, it has been found that the sloped tubes are more readily visible than are horizontal ones.

Figure 2:
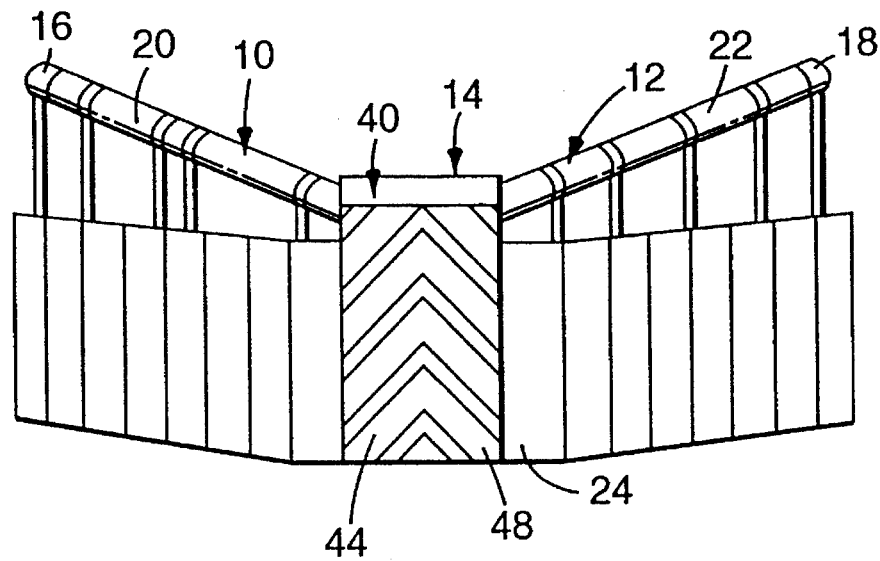
FIG. 2 shows a second embodiment of the invention.

FIG. 2 shows a second embodiment of the invention. The only difference between the embodiment of FIG. 2 and that of FIG. 1 is that linear light sources 10 and 12 of the embodiment of FIG. 2 slope up rather than down. This has been found to have some advantages over the embodiment of FIG. 1. Both upwardly and downwardly sloping light conduits have proven to be equally visible. The downwardly sloping tubes, however, tend to help emphasize the visual impact of the chevron symbol that is commonly used for marking a rigid obstacle. In addition, by sloping linear light sources 10 and 12 down, internally illuminated sign 14 may be mounted higher than it may be with upwardly sloping conduits. In northern climates this has the practical advantage of allowing snowplows to pass under sign 14.

Linear light sources 10 and 12 are similar to the line light source described in U.S. Pat. No. 5,043,850, except that the line light source described in that patent is illuminated in both directions. In the linear light sources of the present invention, a light emitting element is placed at only one end of each of the linear light sources. As described in that patent, such linear sources make very efficient use of the light injected therein. This is because most of the light that escapes from such a light conduit is traveling in a direction such that it is visible only to a person facing along the tube toward the light emitting element, i.e., an oncoming motorist. Thus, even with a comparatively low wattage lamp, the entire length of the light conduit is illuminated while still leaving sufficient light to illuminate the internally illuminated sign at the end. In tests, 50 watt bulbs have worked well even in areas of high ambient light, while bulbs consuming as little as 20 watts will work in areas of low ambient light. The directionality of the light output provides the additional advantage that the conspicuity enhancer is clearly visible to an oncoming motorist, while not being distracting to someone traveling in the opposite direction.

Figure 3:
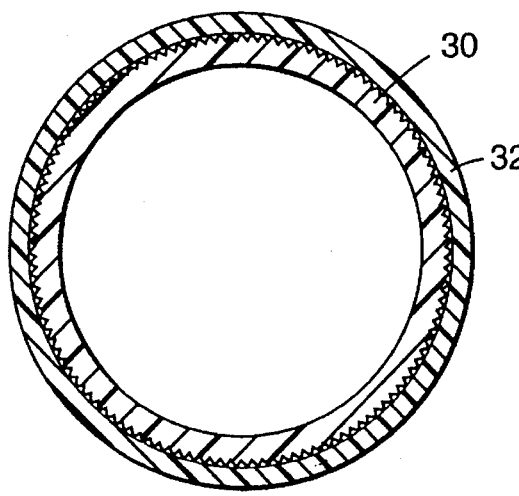
FIG. 3 is a transverse cross-sectional view of a linear light source that may be used in the invention.

FIG. 3 is a cross-sectional view of a light conduit such as light conduit 20 or 22. As shown in FIG. 3, light conduits 20 and 22 each have a light conductive element 30. This is preferably a tube having a smooth inner surface and a structured outer surface. The structured outer surface of tube 30 has a plurality of linear substantially right-angled prisms positioned thereon. Preferably tube 30 is of a flexible polymeric material as described in U.S. Pat. No. 4,805,984. Tube 30 may be made of 3M Optical Lighting Film, a product that is commercially available from Minnesota Mining and Manufacturing Company.

Outside of tube 30 is a second tube 32. Tube 32 is provided to provide strength and rigidity as well as to protect the prisms on the outer structured surface thereof from damage as well as contamination and moisture that would degrade its optical performance.

Figure 4:
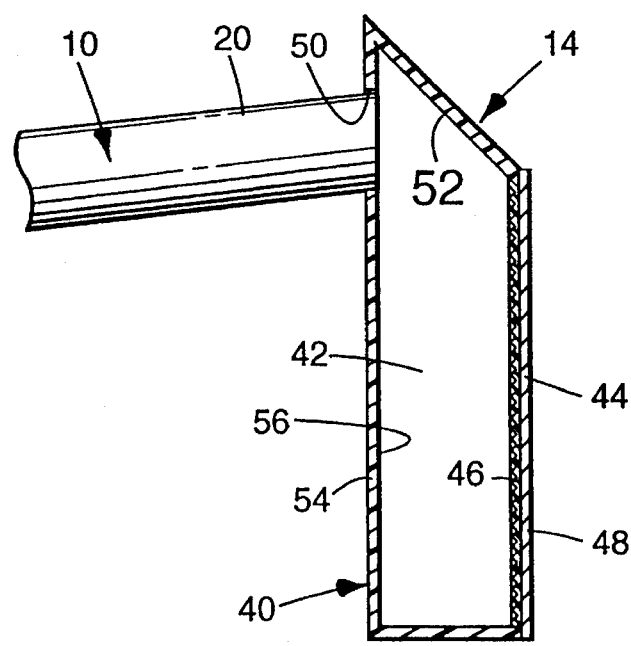
FIG. 4 is a cross-sectional view of a first internally illuminated sign that may be used in the invention.

FIG. 4 is a cross-sectional view of sign 14. Sign 14 includes a case 40 defining an optical cavity 42. Optical cavity 42 has an output optical window 44. In output optical window 44 is a transparent or translucent retroreflective material 46. An example of a retroreflective material that will work with the present invention is Diamond Grade Sheeting, a commercially available product from Minnesota Mining and Manufacturing Company. Outside of the retroreflective sheeting 46 is a second sheet 48 containing graphic images. Typically the image to be used for indicating the path around a rigid obstacle is a chevron pattern. Graphic layer 48 need not cover the entire output surface of sign 14. For example, the common orange and black chevron pattern may be formed by making retroreflective layer 46 of an orange retroreflective film and covering portions of it with an opaque black material.

As shown, light conduits 20 and 22 are in optical communication with optical cavity 42. In order to insure that conduits 20 and 22 are inserted an appropriate distance into optical sign 14, conduits 20 and 22 may be provided with ridges or other commonly used mechanical stops (not shown).

Light enters optical cavity 42 from light conduits 20 and 22 through openings 50. The light travels through optical cavity 42 until it strikes slanted surface 52. Surface 52 is set at an angle such that it will reflect the light in such a way that the maximum brightness will be provided through output optical window 44. Generally this will require that the light will be reflected approximately to the center of inner surface 56 of rear wall 54 of case 40. The angle at which surface 52 should be set will vary with the height of internally illuminated sign 14. Surface 52 may be set on a pivot so that its angle may be changed in order to optimize performance after installation. Surface 52 is preferably specularly reflective. Surface 52 may be rendered specularly reflecting, for example, by applying a sheet of Silverlux reflective tape thereto. Silverlux reflective tape is a highly reflective product commercially available from Minnesota Mining and Manufacturing Company. Surface 56, on the other hand, is preferably diffusely reflecting. This will help to spread the light evenly throughout optical cavity 42, thus providing uniform output in all portions of optical window 44. Surface 56 may be rendered diffusely reflecting simply by painting it with a matte white paint. The remaining interior walls of case 40 should be reflective, although they may be either diffusely reflective or specularly reflective. In most circumstances, however, better performance will result if they are diffusely reflective.

Figure 5:
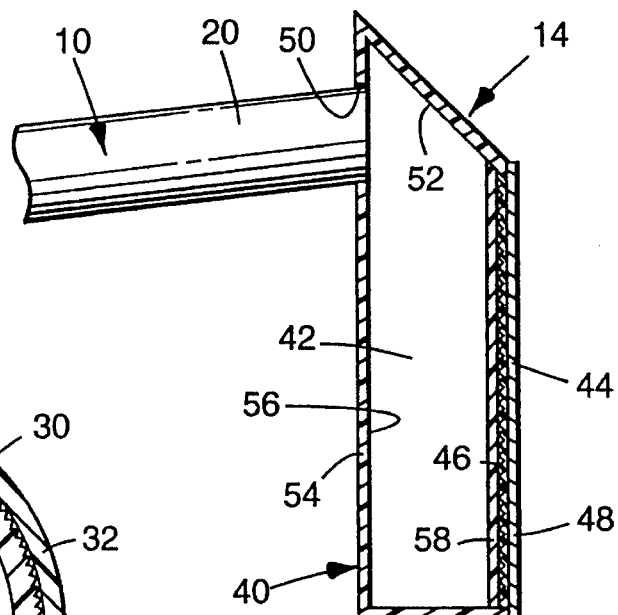
FIG. 5 is a cross-sectional view of a second internally illuminated sign that may be used in the invention.

FIG. 5 shows an alternative structure to that shown in FIG. 4. The difference is that FIG. 5 further includes a structured surface film 58, such as 3M Optical Lighting Film, to help provide greater uniformity of illumination. The structured surface film 58 is placed inside reflective film 46.

A conspicuity enhancer according to the present invention was tested at an exit ramp from a freeway in Duluth, Minn. during the winter of 1991–92. The exit ramp chosen had a history of numerous collisions and had a crash attenuator installed between the freeway and the exit ramp. For example, the attenuator was struck six times during the winter of 1990–91. During the winter of 1991–92, with the conspicuity enhancer of the invention in place, there were no collisions with either the attenuator or the conspicuity enhancer.

I claim:

1. A conspicuity enhancer comprising:

a case defining an optical cavity having an output optical window; and first and second linear light sources external to said optical cavity, each capable of emitting light along its length, each of said linear light sources having a first end and a second end, each of said light sources having a partially collimated light emitting means for injecting light into said first end whereby most of said light emitted by said linear light sources is visible only to a viewer looking along said length and each of said linear light sources having said second end attached to said case such that said linear light sources are in optical communication with said optical cavity, said linear light sources being positioned so as to form a V.

2. A conspicuity enhancer as described in claim 1 further comprising a retroreflective material in said optical output window.

3. A conspicuity enhancer as described in claim 2 further comprising a film having a smooth surface and a structured surface, said structured surface having a plurality of substantially right angled prisms thereon, said film being in said output optical window interior to said optical cavity compared with said retroreflective film.

4. A conspicuity enhancer as described in claim 1 wherein each of said linear light sources includes a tube of a material having a smooth inner surface and a structured outer surface.

5. A conspicuity enhancer as described in claim 4 wherein said structured outer surfaces have a plurality of substantially right-angled prisms thereon.

6. A conspicuity enhancer as described in claim 5 further comprising a retroreflective material in said optical output window.

7. A conspicuity enhancer as described in claim 1 wherein said linear light sources deviate from the horizontal.

8. A conspicuity enhancer as described in claim 7 wherein said first ends of said linear light sources are lower than said second ends.

9. A conspicuity enhancer as described in claim 7 wherein said first ends of said linear light sources are higher than said second ends.

\* \* \* \* \*